(No Model.)
C. A. DAY.
MUSCLE TESTING MACHINE.
No. 535,053. Patented Mar. 5, 1895.
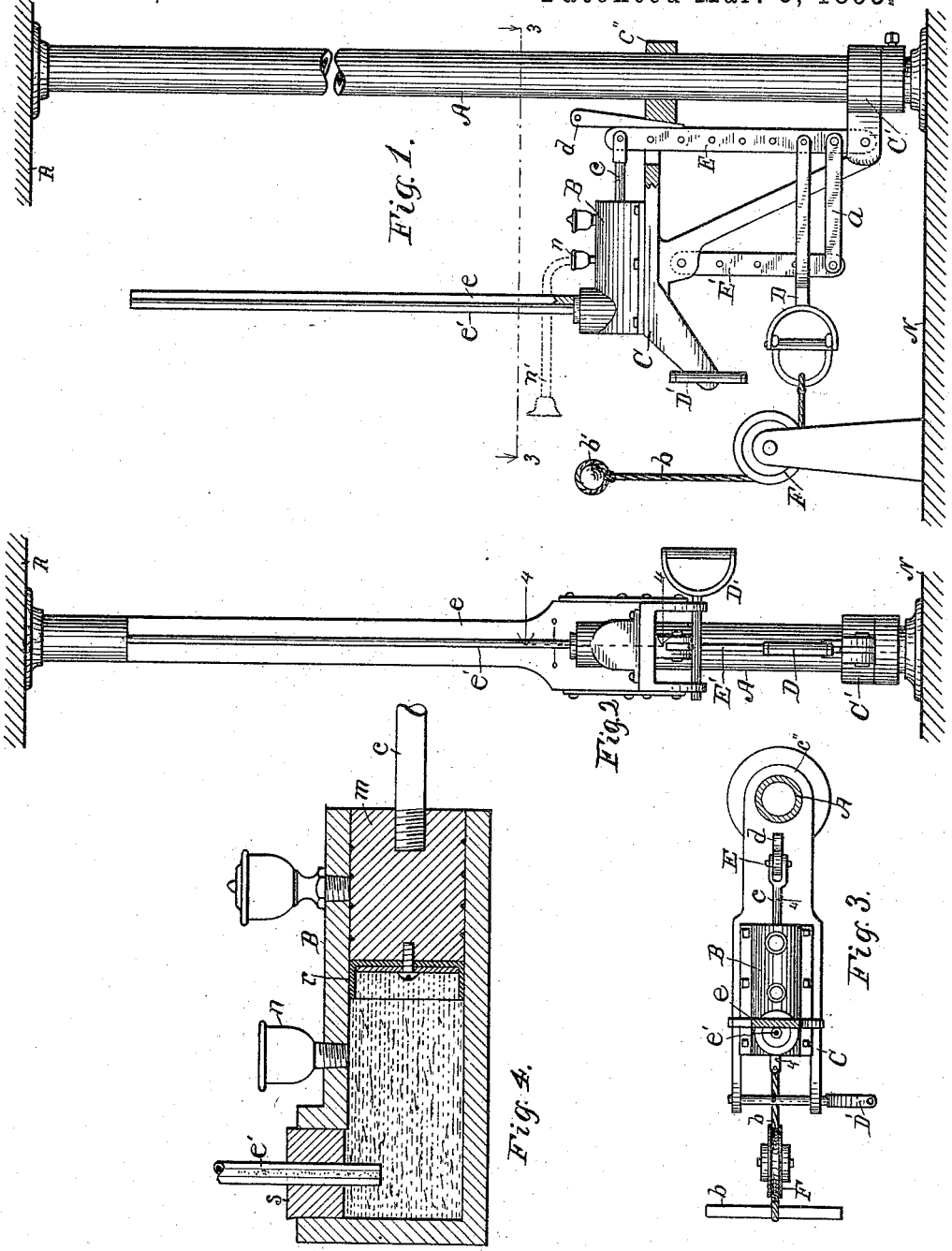
Witnesses:
Walter S. Wood
M. Orrin Longyear
Inventor,
Charles A. Day
By Fred L. Chappell
Att'y.

UNITED STATES PATENT OFFICE.

CHARLES A. DAY, OF KALAMAZOO, MICHIGAN.

MUSCLE-TESTING MACHINE.

SPECIFICATION forming part of Letters Patent No. 535,053, dated March 5, 1895.

Application filed March 8, 1894. Serial No. 502,792. (No model.)

*To all whom it may concern:*

Be it known that I, CHARLES A. DAY, a citizen of the United States, residing at the city of Kalamazoo, in the county of Kalamazoo and State of Michigan, have invented certain new and useful Improvements in Muscle-Testing Machines, of which the following is a specification.

My invention relates to strength testing machines.

The objects of my invention are, first, to provide a machine that shall record the amount of force exerted upon it; second, to provide a machine which can be adjusted and changed to various heights and positions for testing the different parts of the body; third, to provide a strength testing machine that shall be accurate; fourth, to provide a strength testing machine in which a mercury cistern is used, in which the pressure shall be on a uniform surface at all times; fifth, to provide in a strength testing machine, means for testing the twisting power of the muscles of the hands or of the feet; sixth, to provide in a muscle testing machine suitable means of adjustment so that the power of the stronger muscles can be tested and also the power of the weaker muscles, the adjustment being such that the indicator would indicate both accurately; seventh, to provide, in a muscle testing machine, means of testing the power of the lungs. I accomplish these objects by the mechanism shown in the accompanying drawings, in which—

Figure 1 shows a side elevation of my improved machine ready for operation. Fig. 2 is a front elevation of the same. Fig. 3 is a sectional view on line 3—3 of Fig. 1. Fig. 4 is a sectional view on line 4—4 of Figs. 2 and 3. The sectional views are taken looking in the direction of the little arrows at the ends of the section lines.

Similar letters of reference refer to similar parts throughout the several views.

In the drawings, A represents the column on which my improved machine is adjusted to different heights for the different purposes. R is the ceiling above, and N is the floor below to which I prefer to attach this column. The column, A, can be attached to the floor only, if properly braced, or it can depend from the ceiling, or be attached to the side of the wall of a room.

C is the general frame on which all of the remaining parts are located and is adjustable on the column or standard by two collars $C'$ and $C''$, which are supported and held in position by the adjustable collar below.

B is a cylindrical cistern of mercury, and into the top side of this cylinder is inserted a cork or stopper, $s$, through which is inserted a glass tube, $e'$, which opens at the bottom into the cistern of mercury and projects upward, vertically and is open at the top. To each side of the tube, $e'$, is a plane or plate, $e$, for a scale.

$m$ is a piston head which operates in the cylinder, B, and has a cup packing, $r$, at the front end which, along with the little grooves upon the piston head, $m$, prevents any leakage of mercury from the cistern, B.

The cylinder, B, is securely bolted to the frame, C.

Rearwardly from the piston head, $m$, extends the piston rod, $c$, which is pivotally connected to the top end of the lever, E. The lever, E, extends downwardly and is fulcrumed on a pivot on the collar, $C'$. The lever, $E'$, is fulcrumed on the frame, C, just under the cylinder, B, and extends downwardly and is connected by the link, $a$, near the lower end to the lever, E, a little distance above its fulcrum.

The handle, D, connects with lever, E, or $E'$, and is adapted to be adjusted in a series of holes on either of the levers, E or $E'$, and it is on this handle that the force is applied for testing the pulling strength of any muscle or the pushing strength also, for that matter. The strength in either case exerts a pulling force on the handle, D. Any force exerted on the lever, E, either directly or indirectly forces it against the piston rod, $c$, which pushes on the piston head, $m$, and displaces the mercury in the cylinder, B. The mercury, as it is displaced, is forced up into the glass tube, $e'$, and indicates on the scale the amount of pressure exerted upon the piston head, $m$. This pressure being exerted through the combination of the levers, E, or E and $E'$, will of course always be in proportion to the amount exerted although the full amount of pressure is not exerted on the piston head, $m$.

Back of the lever, E, is a wedge, $d$, which drops between the lever, E, and the frame, C, whenever force is exerted on the handle, D, which pulls the lever, E, over and the mercury will rise, as will readily be seen owing to the construction described, in the tube, e', in proportion to the amount of force exerted. This will be done by carrying the lever, E, forward. As it is carried forward, the wedge, d, drops down between the frame, C, and the lever, E, and retains it at the exact point to which it has been moved. This will, of course, retain the piston head, m, in position and cause the mercury in the tube, E', to stand at the highest point to which it has been raised. This combination makes the machine self recording.

Force need not be exerted by seizing directly hold of the handle, D, but can be exerted by passing a rope, as b, over the pulley, F, and inserting the handle, b', through the rope and exert force in that way; and, in this way, by passing the rope over the pulley or some similar device and adjusting the machine, force can be exerted in any direction or manner desired or required.

By attaching a pulley, F, to the ceiling, or any high part, and passing the rope over it, the device can be used for weighing purposes.

Another handle, D', is journaled into projecting arms on the frame, C, and this handle may be attached to the rope, b, acting through the handle, D, and by seizing the handle, D', in the hand the twisting strength of the muscles of the arm may be tested. The twisting muscles of the leg may be tested in the same way by attaching the foot to the handle, D'.

On the top of the cylinder, B, is a cap, n, in which may be inserted the tube, n', with a mouth piece upon it. By placing the mouth piece to the mouth and exerting pressure upon it, the force of the lungs will be recorded by the mercury in the tube, e', and can be taken from the scales located on the plane, e.

The cork, s, through which the tube, e', passes is made adjustable so that it may be forced down or raised out from against the mercury so that the mercury will stand at zero on the scale at the beginning of the test. This is necessary owing to the fact that the mercury is so sensitive to changes of temperature.

My improved testing machine is capable of considerable variation in its details without departing from my invention. It can be attached firmly to the wall of a room and answer a great many purposes of testing, but it is not so desirable as to have it adjustable on a column. Making it adjustable on a single column is a great advantage owing to the fact that then all the force exerted is exerted in a direct straight line and is not wasted in any lateral strains, but every effort is secured in the action upon the indicator, with only the friction of the indicator and of the joints of the levers to be overcome.

Having thus described my invention, what I claim as new, and desire to secure by Letters Patent, is—

1. In a strength testing machine, the combination of a column, A, the frame, C, adjustable thereon, a cylindrical mercury cistern, B, with the open tube extending vertically from the top, a piston, m, in said cylinder connected by the piston rod, c, to the lever, E, the handle, D, attached to the lever, E, for the purpose of exerting the muscle upon to be tested, and a wedge, d, adapted to drop between the lever, E, and frame, C, to retain the lever in the position to which it has been moved to hold the piston, m, to retain the mercury in the tube, e, to record the test, substantially as described for the purpose specified.

2. In a strength testing machine, the combination of the frame, C, the cylinder, B, with the tube, e', opening into it and extending upwardly therefrom, the piston, m, in the cylinder, B, the lever, E, pivoted to the frame, C, and connected to the piston, m, a handle, D, attached to the lever, E, to depress it, and a wedge, d, to drop between the frame and lever, E, to retain it at the farthest point and so retain the mercury in the tube, e', for the purpose specified.

3. In a muscle testing machine, the combination of the frame, C, the lever, E, pivoted below and extending upwardly, the lever, E', pivoted above and extending downwardly, connecting the link, a, and the handle, D, adjustably attached to either of the levers, E or E', and a suitable dynamometer connected to the levers for recording the force exerted, for the purpose specified.

4. In a strength testing machine, the combination of the cylinder, B, piston, m, with cup packing, r, a tube, e', opening into the cistern and extending upwardly, the said piston being adapted to act on a suitable fluid in the cylinder to elevate it into the upwardly projecting tube, and suitable means of retaining the piston at the farthest limit to which it may be pushed, for the purpose of recording the force exerted.

5. In a strength testing machine, the combination of a cylinder, a piston head in said cylinder, a vertical tube opening into the cylinder, suitable means of forcing the piston head into the cylinder, and a wedge to move between the piston and the frame to retain it at the farthest limit to indicate the force exerted upon the cylinder, for the purpose specified.

6. In a muscle testing machine, a column, A, a frame, C, vertically adjustable thereon and adapted to swing from side to side, the cylinder, B, on said frame, a vertical tube opening into said cylinder, a piston adapted to reciprocate in said cylinder and a handle connected to said piston to operate the same, for the purpose specified.

In witness whereof I have hereunto set my hand and seal in the presence of two witnesses.

CHARLES A. DAY. [L. S.]

Witnesses:
WALTER S. WOOD,
M. IRENE LONGYEAR.